(12) United States Patent
Olapinski et al.

(10) Patent No.: US 7,329,310 B2
(45) Date of Patent: Feb. 12, 2008

(54) FILTER MODULE

(75) Inventors: Hans Olapinski, Aichwald (DE);
Dieter Bläse, Mutlangen (DE);
Hans-Peter Feuerpeil, Schwäbisch
Gmünd (DE)

(73) Assignee: Westfalia Separator AG, Oelde (DE)

( * ) Notice: Subject to any disclaimer, the term of this patent is extended or adjusted under 35 U.S.C. 154(b) by 218 days.

(21) Appl. No.: 11/146,684

(22) Filed: Jun. 7, 2005

(65) Prior Publication Data

US 2005/0217485 A1  Oct. 6, 2005

Related U.S. Application Data

(62) Division of application No. 10/239,282, filed on Dec. 23, 2002, now abandoned.

(30) Foreign Application Priority Data

Apr. 1, 2000 (DE) ................. 100 26 344

(51) Int. Cl.
*B01D 46/00* (2006.01)
*B01D 53/22* (2006.01)

(52) U.S. Cl. ................ 95/273; 95/285; 95/286;
55/484; 55/490; 55/502; 55/503; 55/523;
55/524; 55/350.1; 96/4; 96/7; 96/8; 96/11;
210/644; 210/321.88; 210/321.89; 210/323.2

(58) Field of Classification Search ............. 55/490,
55/484, 495, 502, 503, 523, 350.1, 524; 95/45,
95/273, 285, 286; 96/4, 7, 8, 10, 11; 210/445,
210/450, 644, 321.61, 321.87, 321.88, 321.89,
210/323.2; 427/445
See application file for complete search history.

(56) References Cited

U.S. PATENT DOCUMENTS

| | | | | |
|---|---|---|---|---|
| 3,832,830 | A * | 9/1974 | Gerow | 96/8 |
| 4,203,844 | A * | 5/1980 | Amicel et al. | 96/8 |
| 4,368,119 | A | 1/1983 | Wilson | 210/137 |
| 4,824,566 | A * | 4/1989 | Thibos | 96/7 |
| 4,849,104 | A * | 7/1989 | Garcera et al. | 210/323.2 |
| 4,880,536 | A * | 11/1989 | Haraveth et al. | 210/232 |
| 5,143,150 | A * | 9/1992 | Johnston | 165/45 |
| 5,288,308 | A * | 2/1994 | Puri et al. | 96/8 |
| 5,916,440 | A * | 6/1999 | Garcera et al. | 55/502 |

* cited by examiner

*Primary Examiner*—Jason M. Greene
(74) *Attorney, Agent, or Firm*—Ohlandt, Greeley, Ruggiero & Perle, L.L.P.

(57) ABSTRACT

The invention relates to a filter module having a module housing and at least one filter element. The filter module has at least one inlet opening, at least one filtrate outlet and a module housing having at least one joint line.

7 Claims, 2 Drawing Sheets

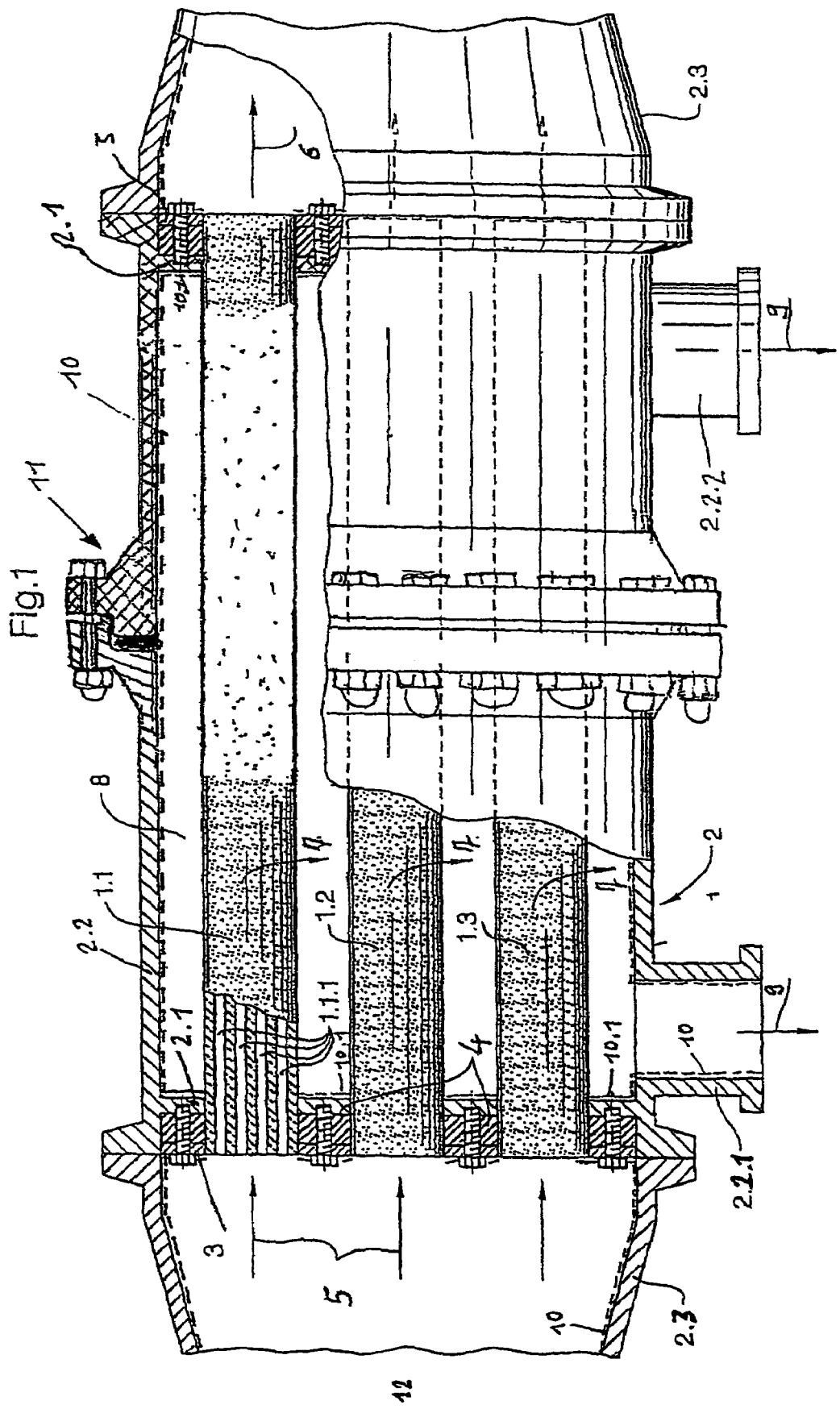

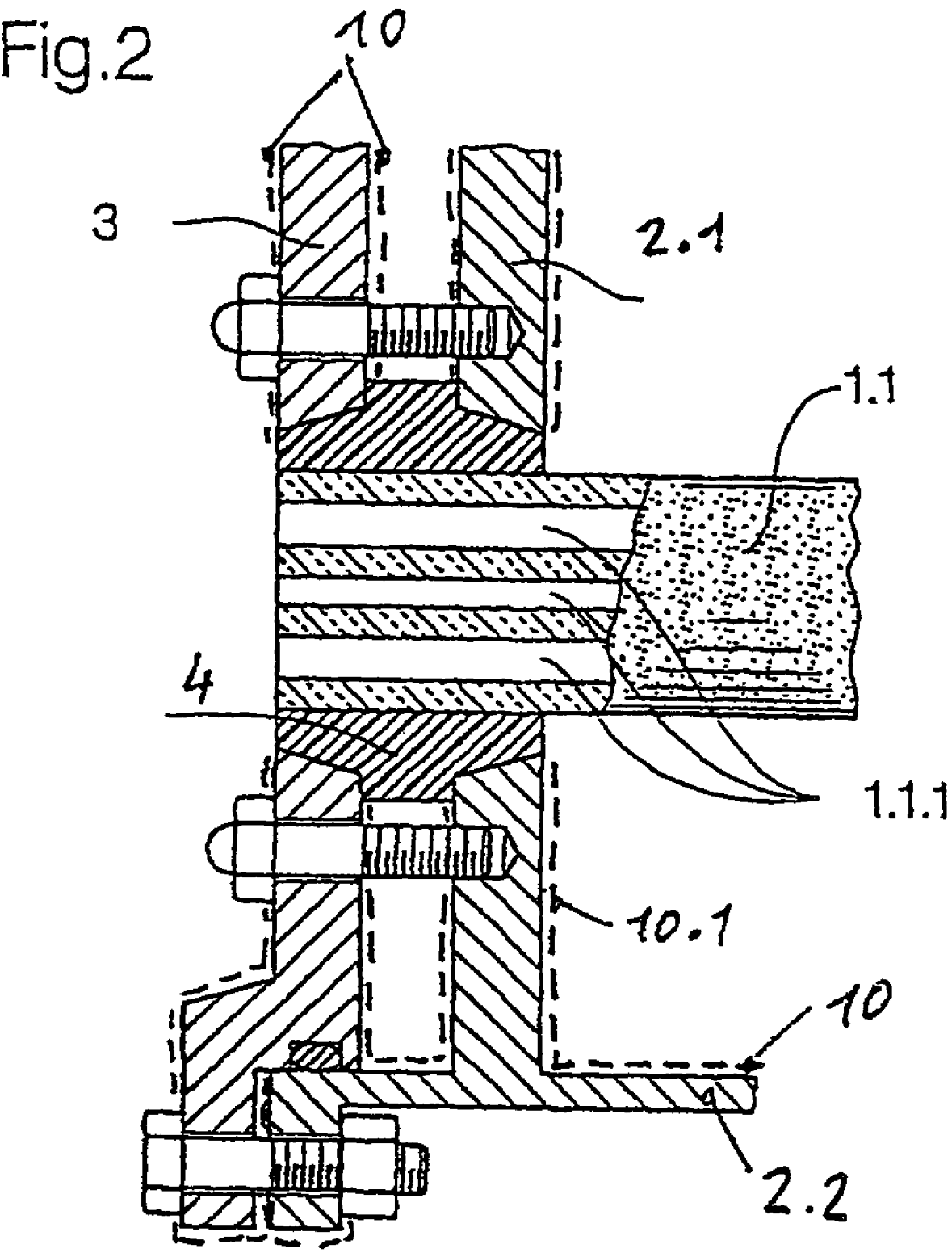

FILTER MODULE

RELATED APPLICATIONS

This application is a division of, and claims priority in, U.S. patent application Ser. No. 10/239,282, filed Dec. 23, 2002 now abandoned, the disclosure of which is incorporated herein by reference.

BACKGROUND OF INVENTION

1. Field of the Invention

This invention relates to a filter module. More particularly, this invention relates to a filter module having a module housing, and at least one filter element. Even more particularly, this invention relates to a filter module having at least on inlet opening, at least one filtrate outlet and the module housing having at least one joint line.

2. Description of the Prior Art

Filter modules are known from process technology. They are used in many ways. U.S. Pat. No. 4,368,119 shows an apparatus for filtering a liquid, for example. U.S. Pat. No. 4,849,104 shows another apparatus filter module. Especially filter modules which work according to the membrane separation method are used in the treatment of water, in desalination of sea water and briny water, in the foodstuff industry, in the pharmaceutical and electric industries to separate a component from a liquid or a gas. Filter modules comprise a number of rod-like filter elements when configured according to the principle of tube modules which are arranged parallel with respect to each other. Groups of such filter elements are usually combined and clamped at the ends by means of tops in the module housing. The tops extend perpendicular to the rods and are provided with a number of bores corresponding to the number of filter elements. The internal space of the filter elements is sealed off at the ends with respect to the internal space of the module housing. The medium to be filtered is introduced into the filter elements, the permeate passes through the membrane layer of the filter elements and the residue remains in the filter element or is discharged again via an outlet.

Due to the large range of applications of the filter modules, different requirements are placed on the materials both of the filter elements as well as the module housing parts and the tops. Frequently, the application of a surface coating is necessary in the filter module housing or the tops in order to protect the suspension from impurities on the one hand and to protect the housing parts and the tops from corrosion on the other hand.

Due to the fact that especially the internal surfaces of the filter module housing need to be coated, the application of the coating is difficult and unsatisfactory, especially frequently in the area of the interior face sides.

SUMMARY OF THE INVENTION

The invention is therefore based on the object of providing an embodiment of the filter module in which the application of a surface coating can occur in a simple manner and in a high-quality fashion. Furthermore, the invention is to provide a method in which the application or renewal of the surface coating occurs in a quick, cost-effective and high-quality way. This object is achieved by the features of the independent claims.

BRIEF DESCRIPTION OF THE DRAWINGS

Other and further objects, advantages and features of the present invention will be understood by reference to the following specification in conjunction with the accompanying drawings, in which like reference characters denote like elements of structure and:

FIG. 1 shows a filter module in an embodiment with a radial flange; and

FIG. 2 shows a sectional view of the zone of a filter module at the end of the housing.

DETAILED DESCRIPTION OF THE INVENTION

In order to make the areas of the surface to be coated which are difficult to access especially at the interior face sides of the module housing, the filter module housing is configured in accordance with the invention with one or several partial joints, especially one or several partial radial joints.

The application of a coating, preferably one or several of the materials of chloropolyvinyl chloride (CPVC), polypropylene, polyvinylidene fluoride (PVDF), Hastelloy or titanium, no longer needs to be made through the small bores (according to the diameters of the filter elements) at the face sides of the module housing, but instead can simply occur through the considerably larger internal diameter of the module housing when the partial joint is opened. This is especially advantageous when coating the internal face surfaces of the module housing, because the coating no longer occurs "around the corner" in this case, but in a virtually frontal fashion. Especially in the case of long module housings, an arrangement with several radial flanges is appropriate, so that the surfaces to be coated are easy to reach and are not situated too far inwardly.

Of course, as a result of the arrangement of the filter module in accordance with the invention, any other machining of the interior surfaces of the filter module such as polishing or plating (with platinum for example) is made much easier or even possible in the first place as compared with previously known methods.

In a preferred embodiment of the present invention, the module housing parts are mutually connected in the zone of the flanges by means of a screwed connection and advantageously sealed off against the ambient environment with a sealing ring, for example. The top plates can also be screwed onto the module housing and be sealed off.

In order to avoid any leakage between the residue and the permeate at the end of the filter elements it is advantageous to seal off the filter elements by means of a sealing element at their ends with respect to the module housing and the top plates.

In a further preferred embodiment the present invention provides a method for applying a coating onto the surface of the filter module housing. The individual parts of the filter module housing are advantageously coated at first and then joined together. The precise procedure shall be explained below by reference to the enclosed drawings.

The invention is now explained in closer detail by reference to two embodiments and the enclosed drawings, wherein:

FIG. 1 shows a filter module in an embodiment with a radial flange; and

FIG. 2 shows a sectional view of the zone of a filter module at the end of the housing.

The filter module as shown in FIG. 1 has a number of filter elements 1.1, 1.2, 1.3. The rod-like filter elements have a cylindrical shape and a circular cross section, with each filter element being penetrated by a plurality of channels 1.1.1. The filter module further has a housing 2 in which the filter elements 1.1, 1.2, 1.3 are arranged in parallel. The face sides 2.1 of the housing are provided with bores into which the filter elements 1.1, 1.2, 1.3 are fitted. At their ends the filter elements 1.1, 1.2, 1.3 are fixed by means of a head plate 3 and sealed off by means of sealing elements 4 from the internal space of the filter module housing 2. The basic body 2.2 of the housing 2 is provided with a circular cross section and comprises the two filter outlets 2.2.1, 2.2.2 and a conical connection piece 3.4. each at its ends.

The channels 1.1.1 of the filter elements 1.1, 1.2, 1.3 are charged with the suspension to be filtered (see arrows 5). Arrow 6 shows the outlet of the suspension, the so-called residue.

The so-called permeate (arrows 7) passes through the membranes into the internal space of the housing 2 which encloses the filter elements 1.1, 1.2, 1.3 and exits through the filter outlets 2.2.1 and 2.2.2 (arrows 9).

The surface of the filter module housing 2 and the top 3 is coated, which is indicated here by the line 10. Due to a radial partial joint which is arranged in this case in the form of a radial flange 11, the entire surface 10 can be coated in accordance with the invention in a simple and high-quality fashion, which is not possible in an arrangement without a radial partial joint in particular for the internal surfaces 10.1 of the face sides 2.1.

FIG. 2 shows a sectional view of the face-side area of the filter module housing.

The method according to the preamble of claim 11 shall be explained by reference to FIG. 1 by using an example.

The main parts 2.2 of the filter module housing 2 are coated at first along the line 10 which is shown in the dot-dash line. The coating can preferably be made from the end which is opposite of the face side 2.1 through the opening with the interior diameter of the main part of the module housing 2.2. As a result, the coating of the zones 10.1 at the face side 2.1 of the module housing is also possible in a simple way and in a high-quality fashion.

One or several of the following materials of chloropolyvinyl chloride (CPVC), polypropylene, polyvinylidene fluoride (PVDF), Hastelloy or titanium can be used as possible coating materials. The main parts 2.2 of the filter module 2 are mounted on each other. In this embodiment the screwed connections of the flange 11 are tightened.

Thereafter the filter elements 1.1, 1.2, 1.3 are inserted into the joined main parts 2.2 of the module housing 2 in such a way that their ends project at both sides beyond the face sides 2.1 of the module housing. Then the sealing elements 4 and the top plates 3 are mounted at the face sides 2.1 of the module housing 2. In this embodiment this occurs by means of a screwed connection.

This method can be used in accordance with the invention not only for the first mounting of the filter modules but is also preferably suitable for repairing damage to the coating surface, e.g. by wear and tear during operation. A further advantage is the favorable possibility of inspecting the surface. Advantages of the invention are further that also the cleaning of the module housing is facilitated and the exchange of individual main parts (2.2) of the filter module housing is possible in the case of damage.

Other modifications of the present invention will be obvious to those skilled in the art in the foregoing teachings. Moreover, while the present invention has been described with reference to specific embodiments and particular details thereof, it is not intended that these details be construed as limiting the scope of the invention, which is defined by the following claims.

It should be understood that the foregoing description is only illustrative of the present invention. Various alternatives and modifications can be devised by those skilled in the art without departing from the invention. Accordingly, the present invention is intended to embrace all such alternatives, modifications and variances of the present invention as defined in the appended claims.

What is claimed is:

1. A method for coating one or more surfaces of a module housing of a filter module comprising:
   providing the module housing having a body with at least two parts and at least two face sides with a plurality of bores for guiding through a plurality of filter elements, said plurality of filter elements being arranged as a tubular membrane;
   applying a coating onto the one or more surfaces of the module housing;
   coating said plurality of filter elements individually;
   joining said at least two parts of said body of said module housing together;
   inserting said plurality of filter elements in the module housing such that said plurality of filter elements project on a first side and a second side of said at least to face sides of said module housing; and
   fixing at least one top plate to said at least two face sides of the module housing and sealing off an inner space the module housing by a seal.

2. The method of claim 1, wherein said at least two parts of said body of said module housing are connected by a radial flange.

3. The method of claim 1, further comprising threadingly connecting said at least one top plate to said at least two face sides of the module housing.

4. The method of claim 1, wherein the coating is selected from the group consisting of chloropolyvinyl chloride, polypropylene, polyvinylidene fluoride, hastelloy, titanium, and any combinations thereof.

5. The method of claim 1, further comprising polishing at least a portion of the module housing.

6. The method of claim 1, further comprising plating at least a portion of the module housing.

7. The method of claim 1, further comprising plating at least a portion of the module housing with platinum.

* * * * *